United States Patent Office 3,380,961
Patented Apr. 30, 1968

3,380,961
ULTRAVIOLET LIGHT AND OXIDATION
STABILIZERS
Hans Dressler, Pitcairn, and Kenneth G. Reabe, Delmont,
Pa., assignors to Koppers Company, Inc., a corporation
of Delaware
No Drawing. Filed Mar. 17, 1966, Ser. No. 535,046
8 Claims. (Cl. 260—45.9)

This invention relates to stabilizers for plastics. More specifically it relates to plastic compositions stabilized against degradation resulting from exposure to ultraviolet radiation and stabilized against oxidation.

It is well known that many plastic materials tend to undergo deterioration upon exposure to ultraviolet radiation. Light having wave lengths of about 290–400 millimicrons causes photocatalyzed changes, such as yellowing or embrittlement, in unstabilized polymers. This is particularly undesirable for colorless, translucent, and transparent plastics which are required to withstand long exposure to sunlight. To overcome this problem it is usually necessary to stabilize plastics, such as for use in translucent roofing, transparent structures, protective coatings, impact-resistant windows, and decorative structures, which are subject to prolonged exposure to ultraviolet radiation.

As a general rule, an effective ultraviolet light stabilizer should have a molar extinction coefficient of equal to or greater than 4.0 in the 300–400 millimicron spectral region to have potential value as an ultraviolet light stabilized for plastics. However, individual plastics are generally more susceptible to deterioration by radiation of particular wave lengths. Polyethylene and polystyrene are susceptible to radiation having a wave length of 300–320 millimicrons.

It is also known that many plastic materials tend to undergo deterioration in the presence of oxygen. The rate of deterioration, of course, is dependent upon the oxygen content of the atmosphere to which the material is exposed, the temperature, pressure, and the like. The presence of sunlight is known to accelerate oxidation deterioration when oxidation conditions exist.

Therefore, such plastic materials are usually stabilized against both oxidation deterioration and ultraviolet light deterioration. This presents formulation problems because a good oxidation stabilizer may tend of itself to yellow the plastic material under prolonged ultraviolet light exposure, thus countering the effect of the ultraviolet light stabilizer. A good ultraviolet light stabilizer, while it may inhibit photo-oxidation in the plastic material, may deleteriously affect the anti-oxidant stabilizer and thereby counter its protective properties.

The choice of a good ultraviolet light stabilizer and a good oxidation stabilizer is thus narrowed to a range of compounds which may not necessarily be economically wise choices. A single compound which would provide both oxidation stabilization and stabilization against ultraviolet light degradation is extremely desirable.

Allen et al. state in U.S. Patent No. 2,763,657 that certain dialkyl-aminomethyl substituted aroylresorcinols are useful as ultraviolet absorbers. However, these compounds fail to show any significant anti-oxidant properties when incorporated into a plastic substrate. As evidenced in the examples following herein, these compounds are not equal in properties to the standard anti-oxidant compounds normally added to plastic in conjunction with various ultraviolet light absorbers to inhibit oxidation of the plastic material.

Quite surprisingly, we have discovered certain compounds which are compatible with and effective in a large number of plastic materials and exhibit outstanding ultraviolet light absorbing properties as well as antioxidant properties.

It is therefore an object of the present invention to provide a composition which is resistant to degradation by ultraviolet radiation and by oxidation.

It is a further object of the present invention to provide plastic compositions containing the compounds of the invention which are substantially resistant to photo-oxidation deterioration.

In accordance with the present invention, we have discovered that compounds of the formula:

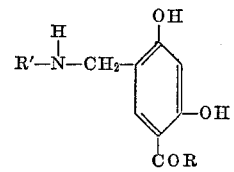

wherein R is selected from a phenyl group and an alkyl group having from one to eighteen carbon atoms, and R' represents a tertiary alkyl group having from four to sixteen carbon atoms, are particularly useful as ultraviolet light and oxidation stabilizing agents for plastic materials.

The ultraviolet light and oxidation stabilizer of the present invention can be readily incorporated into the plastic material by various standard procedures. In one technique the dry stabilizer in powdered form is mixed with a powdered or granular plastic and the mixture is then appropriately treated by molding or extruding. In another procedure an aqueous suspension or emulsion of finely divided polymeric material may be admixed with a suspension or emulsion of the stabilizing agent. Alternatively, it is possible to spray or mix a polymeric material in powdered or granular form with a solution or dispersion of the stabilizing agent in an appropriate solvent, such as hexane or benzene. It is also possible to incorporate the stabilizing agent in a finished article by introducing the plastic material into a bath containing the stabilizing agent in an appropriate liquid solvent and permitting the plastic material to remain in the bath for some time until the plastic has been properly treated. Thereafter, the material is dried to remove any of the remaining solvent. Plastic material in the form of fibers and films may also be sprayed with a solution or suspension of the stabilizing agent in a solvent or dispersant by any standard technique.

The plastic material should contain a stabilizing amount of the ultraviolet light-absorbing and oxidation agent; that is, the amount of stabilizing agent sufficient to prevent deterioration and embrittlement of the plastic material. The amount of stabilizing agent to be used will depend to a large extent upon the amount of exposure to which plastic is subjected and the nature of the plastic to be treated. The agent is generally added in an amount of between 0.01 and 5 percent by weight of the plastic material and preferably between 0.1 and 4 percent by weight.

The stabilizing agent imparts protection against ultraviolet radiation and oxidation to numerous plastic materials which are sensitive to ultraviolet light and photo-oxidation. These include, for example, clear films made of polyester resins, polyvinyl chloride, and cellulose acetate, which are used in packaging dyed textile articles and automobile seat covers. The agent also protects flame-resistant, halogen-containing polyesters and styrene-modified maleate glycol resins used in the preparation of glass fiber-reinforced structural panels which are subject to discoloration on outdoor exposure. The stabilizer is effective for protecting polyethylene, polystyrene, polyvinyl acetate, polyvinylchloride, copolymers of vinyl chloride and vinylidene chloride, cellulose resins, such as nitrocellulose, ethylcellulose, and cellulose acetate, and numerous other materials. The agent can be used alone or together with other additives, such a fillers, pigments, etc.

The invention is further illustrated by the following examples:

Example I

To a stirred suspension of 30.4 g. (0.2 mole) of 4-acetylresorcinol in 200 ml. of benzene there was added at 30–35° C., during 20 minutes, 28.2 g. (0.2 mole) of t-octylazomethine. A reddish colored solution was present after the addition from which a solid gradually precipitated during stirring for another 1.5 hours at ca. 32° C. After cooling to 25° C., the mixture was filtered and the solid washed with benzene and dried to give 17.5 g. of off-white solid. The solid melted at 120–122° C. Infrared spectrums identified the product as 4-acetyl-6-(t-octylaminomethyl) resorcinol which has the structural formula:

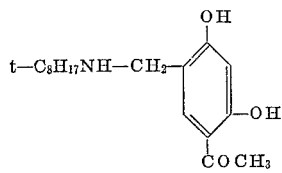

The product is an excellent ultraviolet light stabilizer having a molar extinction coefficient of log ε equal to or greater than 4.0 in the spectral region of 305 to 345 millimicrons. The product is also a valuable stabilizer against the deleterious effects of oxidation.

Example II

The product of Example I was tested to determine its ability to stabilize polystyrene against ultraviolet light degradation. The product in an amount of 0.1 part by weight was blended with 100 parts of polystyrene beads by rolling in a jar mill. The stabilized bead sample and a control sample were extruded into pellets from which discs two inches in diameter and ⅛-inch thick were molded by injection molding. These molded discs were then exposed to ultraviolet radiation under a 325-watt Hanovia lamp for 120 hours. A yellowness index, representing the relative degree of yellow coloration based upon spectrophotometric analysis was determined for the samples. The difference in the yellowness index before and after exposure, or the amount of discoloration caused by the ultraviolet radiation, is designated as the "yellowness factor." The results follow:

TABLE I

| Stabilizer | Weight percent | Yellowness factor |
| --- | --- | --- |
| 4-acetyl-6-(t-octylaminomethyl) resorcinol | 0.1 | −0.1 |
| None | 0.1 | 4.6 |
| Do | 0.1 | 4.2 |

Example III

Six samples, each containing one hundred parts of low-density polyethylene were prepared. One sample contained 0.025 percent by weight of 4-acetyl-6-(t-octylaminomethyl) resorcinol and another sample contained 0.05 percent by weight of this compound. Two more samples were prepared with 0.025 and 0.05 percent by weight respectively of a commercial standard anti-oxidant, 4,4'-thiobis (6-t-butyl-m-cresol) as the stabilizer. The above four samples were prepared by blending the respective compounds together with the polyethylene by milling on a two-roll mill at 165–175° C., for ten minutes. Two additional samples were prepared as controls. The samples were tested for oxidation stabilization as 13–16 mil films at 110° C. The results are shown in Table II.

TABLE II

| Sample | Hours to Embrittlement | |
| --- | --- | --- |
| | 0.025% | 0.05% |
| 4-acetyl-6-(octylaminomethyl) resorcinol | 607 | 1,057 |
| Standard 4,4'-thiobis (6-t-butyl-m-cresol) | 305 | 665 |
| Control | 24 | |

Example IV

To a stirred suspension of 21.4 g. (0.1 mole) of 4-benzoylrecorcinol in 100 ml. of benzene was added 8.5 g. (0.1 mole) of t-butylazomethine during 10 minutes at 22–46° C. (exotherm). The resultant thick, gelatinous mixture was diluted with 50 ml. of benzene, stirred for another hour at ambient temperature, and filtered to give 26.7 g. of solids, melting point 175° C. Infrared analysis established the product to be:

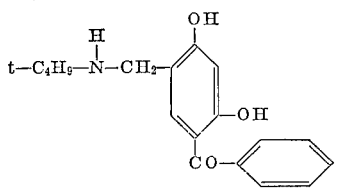

The product is an excellent ultraviolet light stabilizer having a molar extinction coefficient of log ε equal to or greater than 4.0 in the spectral region of 315 to 370 millimicrons. The product is also a good stabilizer against oxidation.

Example V

To a suspension of 42.8 g. (0.2 mole) of 4-benzoylresorcinol in 200 ml. of benzene was added 28.2 g. (0.2 mole) of t-octylazomethine with stirring. An exothermic reaction took place, the temperature rising from 25° C. to 50° C. in three minutes. A clear, light yellow solution formed which soon began to deposit solids. After two hours, the mixture had cooled to 25° C. and was filtered to give 42.0 g. of faintly yellow solids. Upon recrystallization of 35 g. of the product from 150 ml. of 95% ethanol, the product melted at 133–134° C. Infrared analysis established the product to be:

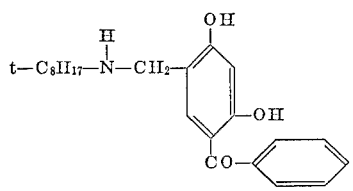

The product is an excellent ultraviolet light stabilizer and a good anti-oxidant. It has a molar extinction coefficient of log ε equal to or greater than 4.0 within the desired spectral region of 300–400 millimicrons.

Example VI

Two polyester test specimens were made using sixty parts by weight maleic anhydride-phthalic anhydride-propylene glycol polyester resin, forty parts by weight styrene, and one percent benzoyl peroxide. In addition, one specimen contained 1.0 percent 4-benzoyl-6-(t-octylaminomethyl) resorcinol. Clear castings were cured at 60–150° C. After 360 hours ultraviolet light irradiation, the tested specimen with additive showed a yellowness factor of −1.0, in marked contrast with the control of 10.9.

Example VII

The products of Examples IV and V were compared with 4-benzoyl-6-dimethylaminomethylresorcinol (U.S. Patent No. 2,763,657) to show the superior anti-oxidant properties in polyethylene of the compounds of the instant invention. A standard was used and also samples having therein a commercial anti-oxidant, 4,4'-thiobis (6-t-butyl-m-cresol). The testing procedure was that described in Example III. The results of the tests follow:

| Compound | Hours to Embrittlement | |
| --- | --- | --- |
| | 0.025% | 0.05% |
| Example IV | 536 | 1,053 |
| Example V | 595 | 886 |
| Standard 4,4'-thiobis (6-t-butyl-m-cresol) | 400 | 600 |
| 4-benzoyl-6-dimethyl-aminomethyl resorcinol | 230 | 280 |
| Control | 24 | |

The results show the unique property of the compounds of the invention of stabilizing plastic materials against oxidation. The compounds even showed greater stabilization ability than the standard and provide ultraviolet stability in addition to the anti-oxidant properties. Thus, there are provided plastic compositions which are stable against both ultraviolet light and oxidation by the addition of the compounds of the invention.

We claim:

1. A polymeric composition stabilized against oxidation and against ultraviolet degradation comprising a polymer selected from the group consisting of polyethylene, polystyrene, polyvinyl acetate, polyvinyl chloride copolymers of vinylidene chloride and vinyl chloride, nitrocellulose, ethyl cellulose, cellulose acetate, and polyester resins having incorporated therein a stabilizing amount of a stabilizer having the formula:

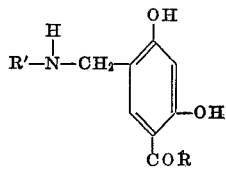

wherein R is selected from the group consisting of phenyl and an alkyl group having from 1–18 carbon atoms, and R' is a tertiary alkyl group having from 4–16 carbon atoms.

2. The polymeric composition of claim 1 wherein the amount of stabilizer is 0.01 to 5 percent by weight of said polymer.

3. The polymeric composition of claim 2 wherein said polymer is polystyrene and said stabilizer is 4-acetyl-6-(t-octylaminomethyl) resorcinol.

4. The polymeric composition of claim 2 wherein said polymer is polystyrene and said stabilizer is 4-benzoyl-6-(t-octylaminomethyl) resorcinol.

5. The polymeric composition of claim 2 wherein said polymer is polystyrene and said stabilizer is 4-benzoyl-6-(t-butylaminomethyl) resorcinol.

6. The polymeric composition of claim 2 wherein said polymer is polyethylene and said stabilizer is selected from the group consisting of 4-acetyl-6-(t-octylaminomethyl) resorcinol, 4-benzoyl-6-(t-octylaminomethyl) resorcinol and 4-benzoyl-6-(t-butylaminomethyl) resorcinol.

7. The polymeric composition of claim 2 wherein said polymer is a polyester.

8. The compound having the formula:

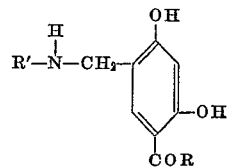

wherein R is selected from the group consisting of phenyl and an alkyl group having from 1–18 carbon atoms, and R' is a tertiary alkyl group having from 4–16 carbon atoms.

References Cited
UNITED STATES PATENTS

| | | | |
|---|---|---|---|
| 2,763,657 | 9/1956 | Allen et al. | 260—294.7 |
| 3,206,428 | 9/1965 | Stanley | 260—45.9 |
| 3,215,759 | 11/1965 | Milionis et al. | 260—45.9 |

DONALD E. CZAJA *Primary Examiner.*

H. E. TAYLOR, *Assistant Examiner.*